(12) United States Patent
Tsuda

(10) Patent No.: US 12,344,246 B2
(45) Date of Patent: Jul. 1, 2025

(54) TRAVELING ASSISTANCE METHOD, TRAVELING ASSISTANCE DEVICE, AND STORAGE MEDIUM

(71) Applicant: TOYOTA JIDOSHA KABUSHIKI KAISHA, Toyota (JP)

(72) Inventor: Yukikazu Tsuda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/100,668

(22) Filed: Jan. 24, 2023

(65) Prior Publication Data
US 2023/0294695 A1 Sep. 21, 2023

(30) Foreign Application Priority Data

Mar. 18, 2022 (JP) .................................. 2022-043696

(51) Int. Cl.
*B60W 30/16* (2020.01)
*B60W 40/08* (2012.01)

(52) U.S. Cl.
CPC ............ *B60W 30/16* (2013.01); *B60W 40/08* (2013.01); *B60W 2554/801* (2020.02)

(58) Field of Classification Search
CPC ................. B60W 30/16; B60W 40/08; B60W 2554/801; B60W 2556/10; B60W 30/12; B60W 30/025; B60W 40/10; B60W 50/00; B60W 50/0098; B60W 2050/0022; B60W 2554/4023
See application file for complete search history.

(56) References Cited

U.S. PATENT DOCUMENTS

| | | | |
|---|---|---|---|
| 2019/0270452 A1 | 9/2019 | Katsura et al. | |
| 2020/0023884 A1* | 1/2020 | Mizoo | B60W 30/16 |
| 2020/0055362 A1* | 2/2020 | Anderson | B60G 17/0195 |
| 2020/0103899 A1* | 4/2020 | Zhu | B60W 50/0098 |
| 2020/0148205 A1* | 5/2020 | Yoshida | B60W 60/00 |

FOREIGN PATENT DOCUMENTS

| | | | |
|---|---|---|---|
| CN | 109835334 A | * | 6/2019 |
| JP | 2019-153039 A | | 9/2019 |
| JP | 6801116 B2 | | 12/2020 |

* cited by examiner

*Primary Examiner* — Anne Marie Antonucci
*Assistant Examiner* — Jewel Ashley Kuntz
(74) *Attorney, Agent, or Firm* — Dinsmore & Shohl LLP

(57) ABSTRACT

Offset control of offsetting a traveling position of a vehicle to increase a lateral distance from an approaching vehicle in an adjacent lane is actuated. When the offset control is actuated, an index value that is decided from an actuation history of the offset control and in which a higher weight is given to an actuation history of the offset control in the recent past than to an actuation history of the offset control in the distant past is calculated. As the index value, the actuation frequency of the offset control in a most recent predetermined time may be calculated. Moreover, an offset amount when the offset control is executed is changed in accordance with the index value.

13 Claims, 6 Drawing Sheets

FIG. 6

| No. | SURROUNDING SITUATION | | VLO CONTROL GAIN PROCESS | OFFSET AMOUNT [cm] |
|---|---|---|---|---|
| 1 | UNOCCUPIED STATE (THE NUMBER OF TIMES OF ACTUATION OF VLO CONTROL < DETERMINATION THRESHOLD VALUE) | | (3) | 20 |
| 2 | | | (3) | 20 |
| 3 | | | (3) | 20 |
| 4 | RELATIVELY CONGESTED STATE (THE NUMBER OF TIMES OF ACTUATION OF VLO CONTROL ≥ DETERMINATION THRESHOLD VALUE) | FIRST TIME | (3) | 20 |
| 5 | | 10 MINUTES HAS ELAPSED | (2) FIRST PROCESS | 15 |
| 6 | | 20 MINUTES HAS ELAPSED | (2) SECOND PROCESS | 10 |
| 7 | | 30 MINUTES HAS ELAPSED | (2) THIRD PROCESS | 5 |
| 8 | | 40 MINUTES HAS ELAPSED | (2) FOURTH PROCESS | 0 |
| 9 | | 50 MINUTES HAS ELAPSED | (2) FIFTH PROCESS | 0 |
| 10 | | 60 MINUTES HAS ELAPSED | (2) SIXTH PROCESS | 0 |
| 11 | UNOCCUPIED STATE (THE NUMBER OF TIMES OF ACTUATION OF VLO CONTROL < DETERMINATION THRESHOLD VALUE) | FIRST TIME | (2) SEVENTH PROCESS | 0 |
| 12 | | 10 MINUTES HAS ELAPSED | (3) FIRST PROCESS | 5 |
| 13 | | 20 MINUTES HAS ELAPSED | (3) SECOND PROCESS | 10 |
| 14 | | 30 MINUTES HAS ELAPSED | (3) THIRD PROCESS | 15 |
| 15 | | 40 MINUTES HAS ELAPSED | (3) FOURTH PROCESS | 20 |
| 16 | | 50 MINUTES HAS ELAPSED | (3) FIFTH PROCESS | 20 |
| 17 | | 60 MINUTES HAS ELAPSED | (3) SIXTH PROCESS | 20 |

TRAVELING ASSISTANCE METHOD, TRAVELING ASSISTANCE DEVICE, AND STORAGE MEDIUM

CROSS-REFERENCE TO RELATED APPLICATION

This application claims priority to Japanese Patent Application No. 2022-043696 filed on Mar. 18, 2022, incorporated herein by reference in its entirety.

BACKGROUND

1. Technical Field

The present disclosure relates to traveling assistance technology, and more particularly to traveling assistance technology including offset control of offsetting a traveling position of a vehicle to increase a lateral distance from an approaching vehicle in an adjacent lane.

2. Description of Related Art

Offset control is known to give a sense of security to an occupant by offsetting a traveling position of a vehicle from a center of a lane to increase a lateral distance from an approaching vehicle in a case where the approaching vehicle is detected in an adjacent lane. The offset control is also called vehicle lateral offset (VLO) control. Japanese Patent No. 6801116 (JP 6801116 B) discloses an example of offset control in the related art. With the offset control disclosed in JP 6801116 B, an offset amount with respect to the approaching vehicle is controlled in accordance with a traveling scene of the vehicle. Traveling scene information for specifying the traveling scene includes, for example, map information, position information of the vehicle in the map information, and surrounding vehicle information on a target positioned around the vehicle.

Examples of the documents showing the technical level at the time of filing in the technical field of the present disclosure or related technical field include Japanese Unexamined Patent Application Publication No. 2019-153039 (JP 2019-153039 A) is described, in addition to JP 6801116 B.

SUMMARY

In the offset control in the related art disclosed in JP 6801116 B, the map information, the position information of the vehicle, and the surrounding vehicle information are used as determination materials for deciding a degree of the offset amount. However, all of these pieces of information are merely information on a current host vehicle or surroundings of the host vehicle. That is, in the offset control in the related art disclosed in JP 6801116 B, no consideration is given to an actuation performance of the offset control so far. Lateral acceleration acts on the occupant when the offset control is executed. Therefore, frequent actuation of the offset control may lead to a sense of discomfort of the occupant, such as car sickness.

The present disclosure is to provide traveling assistance technology that contributes to the reduction of the sense of discomfort of the occupant caused by repeated actuation of the offset control.

A first aspect of the present disclosure provides a traveling assistance method. The traveling assistance method according to the first aspect of the present disclosure includes three steps. A first step is actuating offset control of offsetting a traveling position of a vehicle to increase a lateral distance from an approaching vehicle in an adjacent lane in response to detection of the approaching vehicle. A second step is calculating an index value that is decided from an actuation history of the offset control and in which a higher weight is given to an actuation history of the offset control in the recent past than to an actuation history of the offset control in the distant past. Calculating of the index value may include calculating an actuation frequency of the offset control in a most recent predetermined time. For example, the number of times of offset control actuated in the most recent predetermined time with the weight of zero for the past earlier than the most recent predetermined time may be calculated as the index value. A third step is changing an offset amount when the offset control is actuated, in accordance with the index value. By executing these steps, the actuation history of the offset control, particularly, the actuation history of the recent past is reflected in the offset amount.

Changing the offset amount may include decreasing the offset amount in a case where the index value is equal to or more than a predetermined value. That is, whether or not the actuation frequency of the offset control in the recent past is high may be determined depending on whether or not the index value is equal to or more than the predetermined value, and the offset amount may be decreased in a case where the actuation frequency is high. In addition, changing the offset amount may include increasing, in a case where a request level of the offset control that is currently requested is equal to or more than a predetermined level, the offset amount even in a case where the index value is equal to or more than the predetermined value. That is, a priority may be given to giving the occupant a sense of security. Further, changing the offset amount may include maintaining, after the offset amount reaches a lower limit amount, the offset amount at the lower limit amount even in a case where the index value is equal to or more than the predetermined value.

Changing the offset amount may include increasing the offset amount in a case where the index value is less than a predetermined value. That is, whether or not the actuation frequency of the offset control in the recent past is low may be determined depending on whether or not the index value is less than the predetermined value, and the offset amount may be increased in a case where the actuation frequency is low. In addition, changing the offset amount may include maintaining, in a case where a request level of the offset control that is currently requested is less than a predetermined level, the offset amount at a previous value even in a case where the index value is less than the predetermined value. In other words, the offset amount may be increased solely in a case where the request level of the offset control is equal to or more than the predetermined level. Further, changing the offset amount may include maintaining, after the offset amount reaches an upper limit amount, the offset amount at the upper limit amount even in a case where the index value is less than the predetermined value.

In addition, a second aspect of the present disclosure provides a traveling assistance device. The traveling assistance device according to the second aspect of the present disclosure includes a detection device configured to detect an approaching vehicle in an adjacent lane, and an offset controller configured to offset a traveling position of a vehicle to increase a lateral distance from the approaching vehicle in response to detection of the approaching vehicle in the adjacent lane. The offset controller is configured to execute calculating an index value that is decided from an actuation history of offset control and in which a higher weight is given to an actuation history of the offset control in the recent past than to an actuation history of the offset control in the distant past. In addition, the offset controller is configured to execute changing an offset amount when the offset control is actuated, in accordance with the index value.

Further, a third aspect of the present disclosure provides a storage medium storing a program. The program according to the third aspect of the present disclosure is configured to cause a computer mounted on a vehicle to execute the following processes. A first process is a process of actuating offset control of offsetting a traveling position of the vehicle to increase a lateral distance from an approaching vehicle in an adjacent lane in response to detection of the approaching vehicle. A second process is a process of calculating an index value that is decided from an actuation history of the offset control and in which a higher weight is given to an actuation history of the offset control in the recent past than to an actuation history of the offset control in the distant past. A third process is a process of changing an offset amount when the offset control is actuated, in accordance with the index value. The program according to the third aspect of the present disclosure may be stored in a computer-readable recording medium or may be provided via a network.

The sense of discomfort of the occupant caused by repeated execution of the offset control is more affected by the offset control actuated in the recent past than the offset control actuated in the distant past. The traveling assistance technology of the present disclosure can contribute to the reduction of the sense of discomfort of the occupant by reflecting the actuation history of the offset control, particularly, the actuation history of the recent past in the offset amount when the offset control is actuated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a table showing an operation example of the traveling assistance device based on the flowchart shown in FIG. 5.

DETAILED DESCRIPTION OF EMBODIMENTS

In the following, an embodiment of the present disclosure will be described with reference to the drawings. Note that, in a case where the number, a quantity, an amount, a range, and the like of each element are described in the following embodiment, the idea according to the present disclosure is not limited to the described numerical values except for a case of being particularly pointed out or a case of being clearly specified in principle by the described numerical values. In addition, a structure and the like described in the embodiment described below are not always needed in the idea according to the present disclosure, except for a case of being particularly pointed out or a case of being clearly specified in principle.

1. Outline of Traveling Assistance Method

Figure 1:
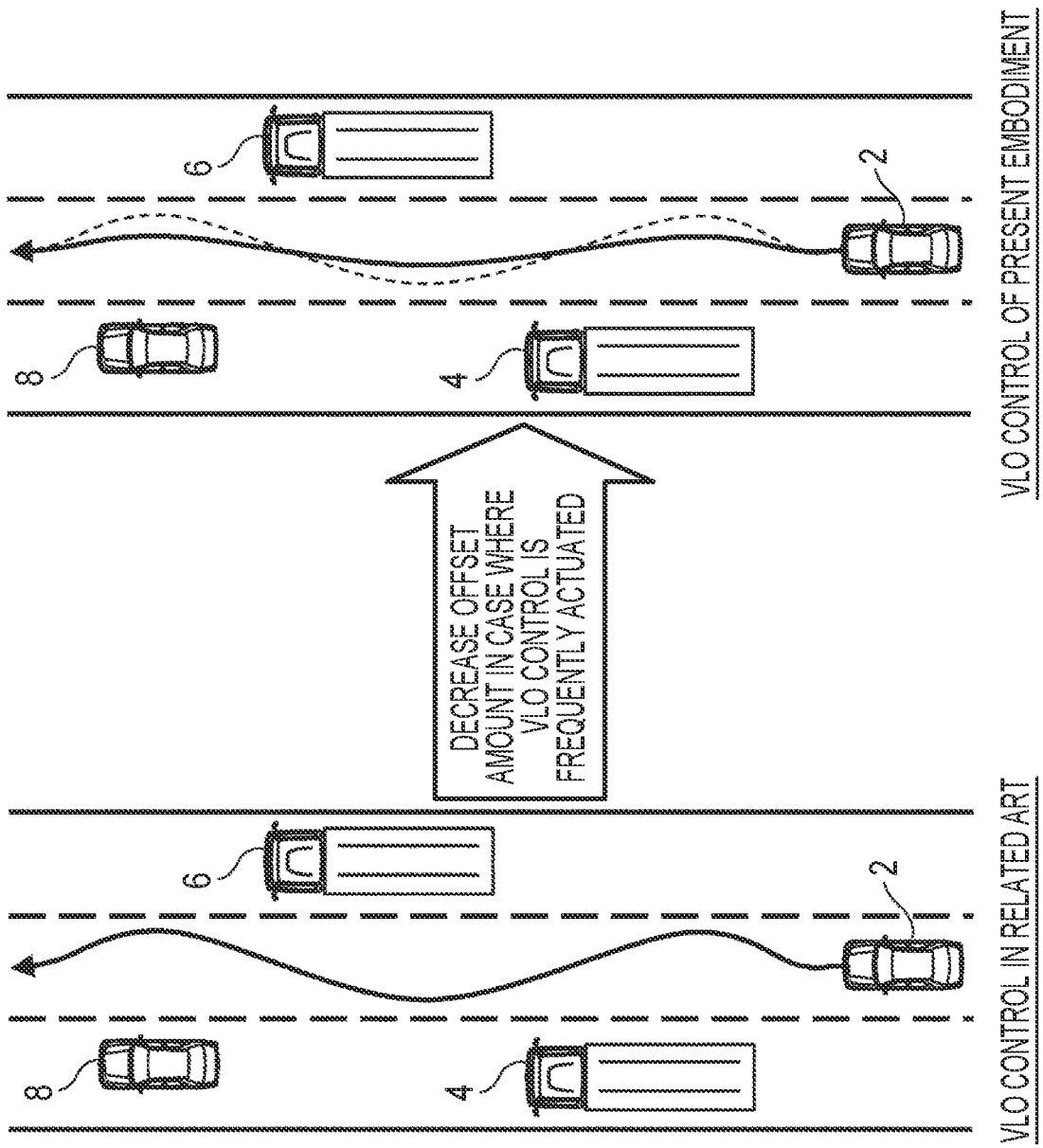
FIG. 1 is a diagram describing an outline of a traveling assistance method according to an embodiment of the present disclosure.

An outline of a traveling assistance method according to the present embodiment will be described. FIG. 1 shows a comparison between VLO control in the related art and VLO control by the traveling assistance method according to the present embodiment (hereinafter, simply referred to as the VLO control of the present embodiment). The VLO control (offset control) is control of offsetting a traveling position of a vehicle from a center of a lane to increase a lateral distance from an approaching vehicle in a case where the approaching vehicle is detected in an adjacent lane.

In FIG. 1, a vehicle 2 is an autonomous driving vehicle in which the VLO control is actuated. Two preceding vehicles 4, 8 travel in a lane adjacent to the left of the lane in which the vehicle 2 travels, and one preceding vehicle 6 travels in a lane adjacent to the right thereof. The preceding vehicle 6 is positioned between the preceding vehicle 4 and the preceding vehicle 8 in a traveling direction. It is assumed that the vehicle 2 overtakes the preceding vehicles 4, 6, 8 under such an environment. When the vehicle 2 overtakes the preceding vehicles 4, 6, 8, the preceding vehicles 4, 6, 8 relatively approach the vehicle 2. That is, each of the preceding vehicles 4, 6, 8 is an approaching vehicle that approaches the vehicle 2 in the adjacent lane.

When the VLO control is actuated, the traveling position of the vehicle 2 is offset in a right direction from the center of the lane when the vehicle 2 lines up with the preceding vehicle 4. Next, when the vehicle 2 lines up with the preceding vehicle 6, the traveling position of the vehicle 2 is offset in a left direction from the center of the lane. Moreover, when the vehicle 2 lines up with the preceding vehicle 8, the traveling position of the vehicle 2 is again offset in the right direction from the center of the lane. As a result, in the related art, the vehicle 2 travels in a meandering manner in the lane, and lateral acceleration repeatedly acts on the vehicle 2. The repetitive action of the lateral acceleration causes an occupant to experience a sense of discomfort, such as car sickness.

In the VLO control of the present embodiment, an offset amount is decreased in a case where the VLO control is frequently actuated. In FIG. 1, a traveling trajectory during the execution of the VLO control in the related art and a traveling trajectory during the execution of the VLO control of the present embodiment are indicated by a dotted line and a solid line, respectively. As is clear from the comparison of the two traveling trajectories, meandering of the vehicle 2 is decreased by decreasing the offset amount. As a result, the lateral acceleration that repeatedly acts on the vehicle 2 is decreased, and a probability of causing the occupant to experience the sense of discomfort is also decreased.

As described above, in a case where the offset amount from the center of the lane is large, the sense of discomfort is given to the occupant in a situation in which the VLO control is frequently actuated. However, simply decreasing the offset amount cannot guarantee a sense of security of the occupant. Therefore, in the present embodiment, the offset amount is changed in accordance with an actuation frequency of the VLO control to achieve both ensuring of the sense of security of the occupant and the reduction of the sense of discomfort.

Figure 2:
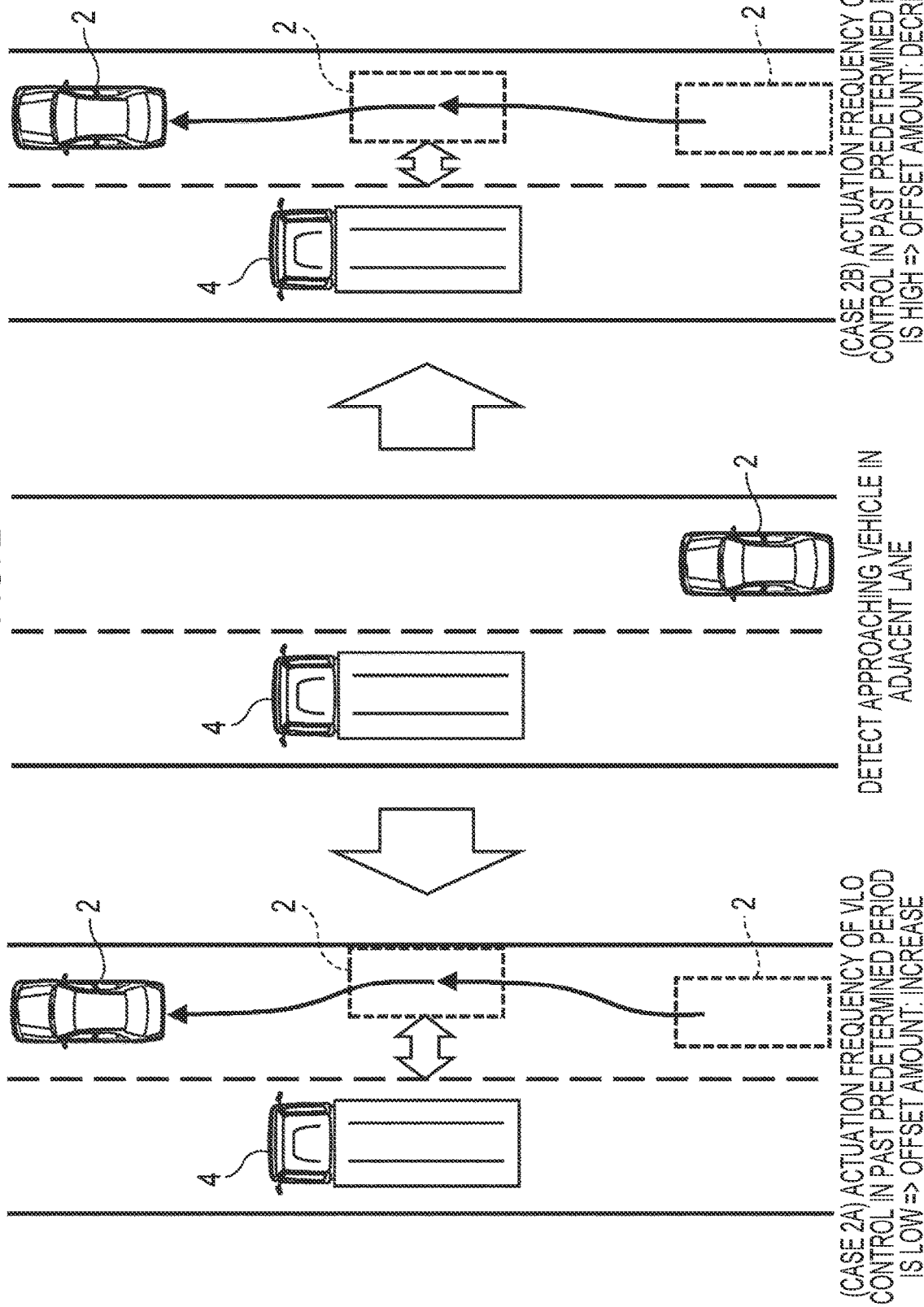
FIG. 2 is a diagram describing an outline of the traveling assistance method according to the embodiment of the present disclosure.

FIG. 2 is a diagram describing details of the VLO control of the present embodiment. The VLO control is actuated in response to the detection of an approaching vehicle 4 in the adjacent lane. In this case, the actuation frequency of the VLO control in a certain set period is calculated. Moreover, in a case where the calculated actuation frequency is low, the offset amount is increased (case 2A). On the other hand, in a case where the calculated actuation frequency is high, the offset amount is decreased (case 2B). Whether or not the actuation frequency is high is determined, for example, by the comparison with a preset determination threshold value. The determination threshold value may be a fixed value or a variable value that is changed in accordance with an environmental condition.

Figure 3:
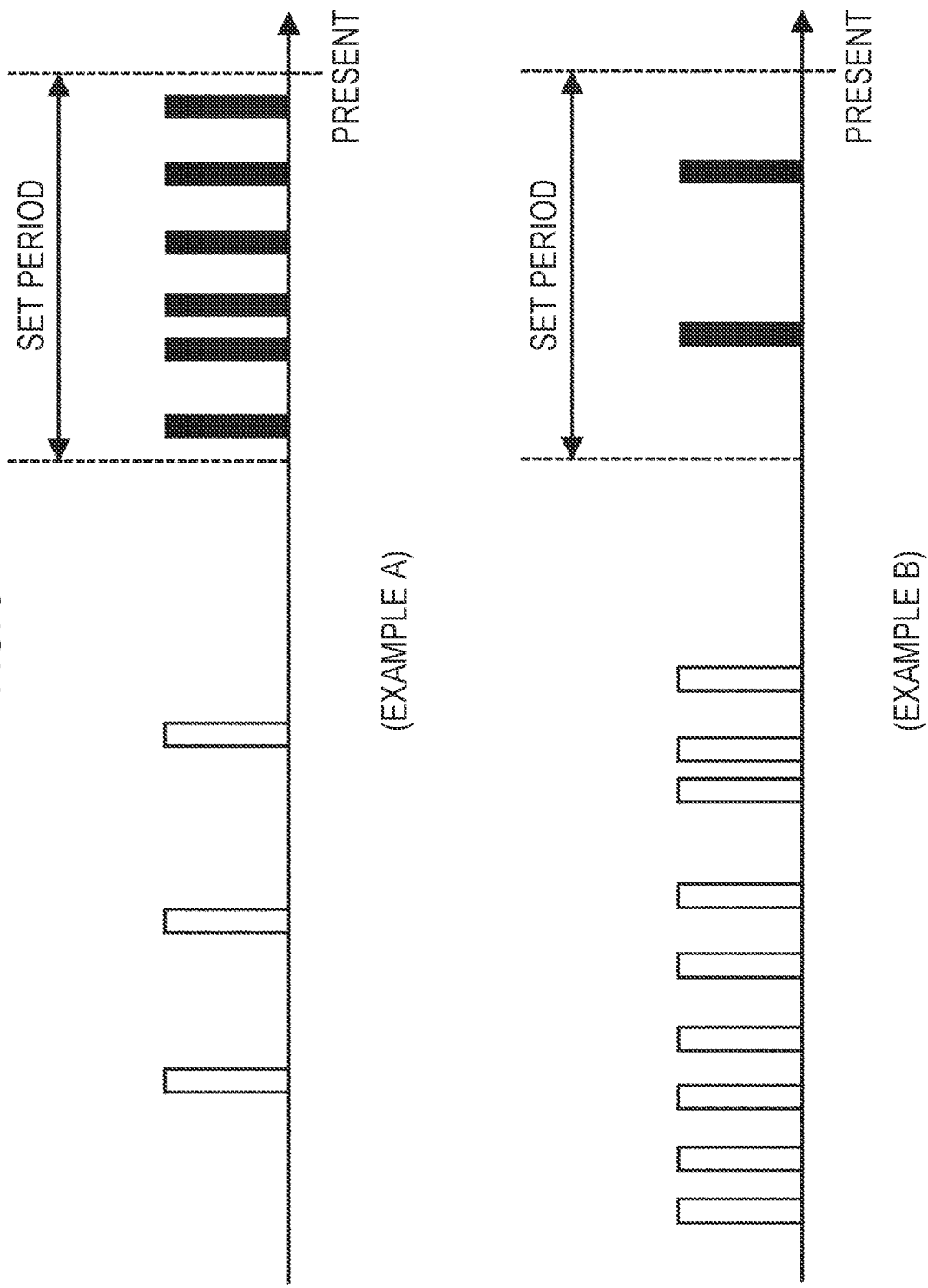
FIG. 3 is a diagram describing a set period for calculating an actuation frequency of VLO control.

FIG. 3 is a diagram describing the set period for calculating the actuation frequency of the VLO control. Bars arranged on a time axis indicate timings at which the VLO control is executed. In the present embodiment, a most recent predetermined time is the set period. The predetermined time is, for example, about 5 minutes to 10 minutes. In a case where the actuation frequency in the set period is equal to or more than a predetermined number of times, the offset amount is decreased, and in a case where the actuation frequency in the set period is less than the predetermined number of times, the offset amount is increased.

Examples A, B are shown in FIG. 3. The total number of times of the actuation of the VLO control is larger in the example B than in the example A. However, the number of times of the actuation of the VLO control in the set period is larger in the example A than in the example B. In a case such as the example B in which the VLO control has been frequently actuated in the distant past and has not been frequently actuated most recently, a consideration is made that a level of the sense of discomfort of the occupant at the present time is not high. The reason is that the occupant tends to experience the sense of discomfort with the lateral acceleration that acts periodically, but no such lateral acceleration acts on the occupant at the present time in the case of the example B. On the other hand, even in a case where the total number of times of the actuation of the VLO control is not large, as in the example A, in a case where the VLO control is frequently actuated most recently, a consideration is made that the level of the sense of discomfort of the occupant is high at the present time.

As described above, the reason why the actuation frequency for the most recent predetermined time is calculated in the present embodiment is that the sense of discomfort of the occupant is affected by solely the actuation history of the VLO control in the recent past and the influence of the actuation history of the VLO control in the distant past is limited. Therefore, an index value for determining whether to decrease or increase the offset amount need only be an index value in which a higher weight is given to the actuation history of the VLO control in the recent past than to the actuation history of the VLO control in the distant past. The actuation frequency of the VLO control in the most recent predetermined time corresponds to an index value in a case where the weight of the VLO control that has been actuated in the most recent predetermined time is set to one and the weight of the VLO control that has been actuated in the past earlier than the most recent predetermined time is set to zero. Note that, in calculating the index value, the weight may gradually approach zero as the time goes back from the present to the past.

2. Configuration of Traveling Assistance Device

Figure 4:
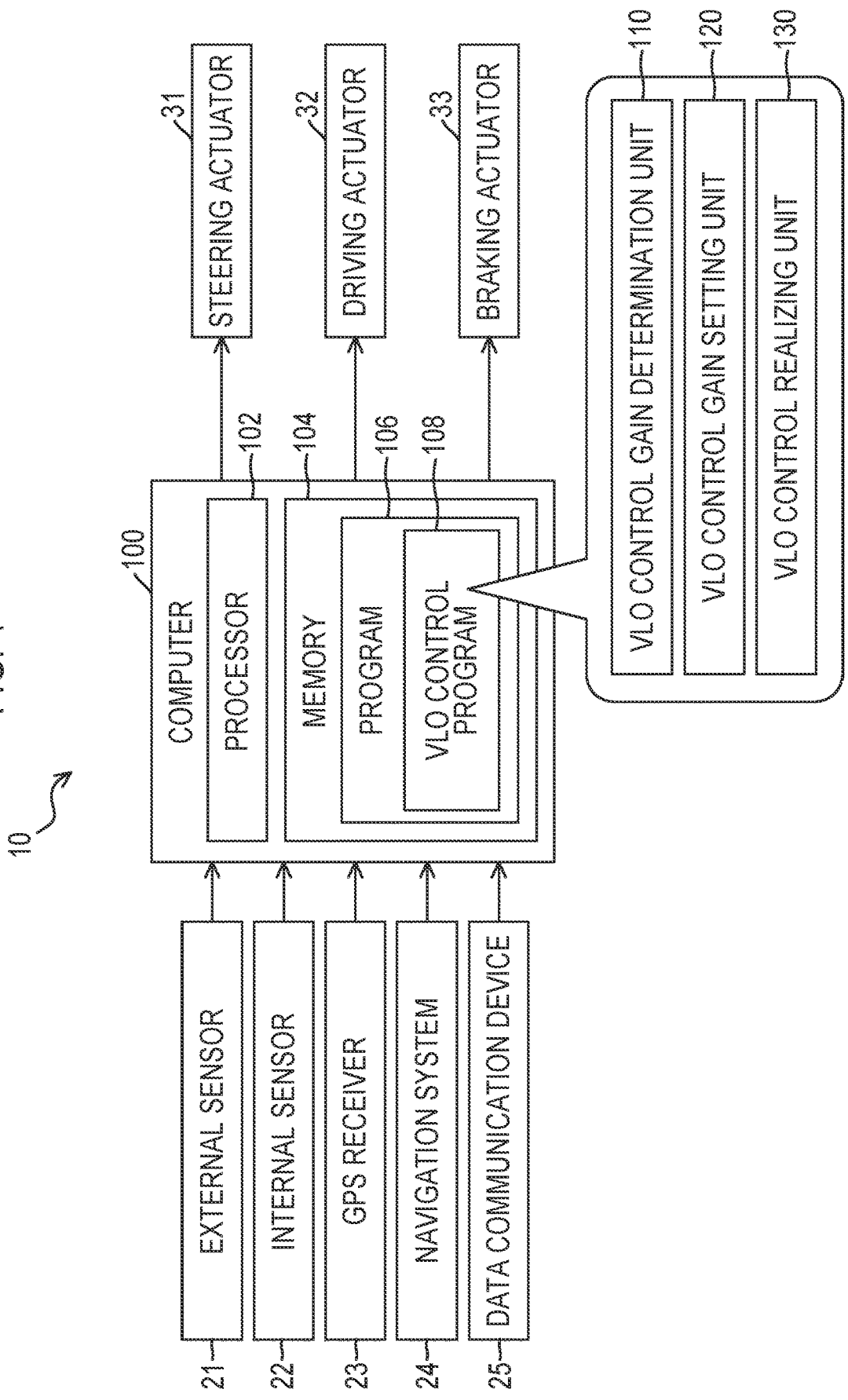
FIG. 4 is a diagram showing a system configuration example of a traveling assistance device according to the embodiment of the present disclosure.

The traveling assistance method described above is carried out by a traveling assistance device according to the present embodiment. FIG. 4 is a diagram showing a system configuration example of the traveling assistance device according to the present embodiment.

A traveling assistance device 10 includes a computer 100 mounted on the vehicle 2. The computer 100 includes one or a plurality of processors 102 (hereinafter, simply referred to as the processor 102) and one or a plurality of memories 104 (hereinafter, simply referred to as the memory 104) coupled to processor 102. The memory 104 stores one or a plurality of programs 106 (hereinafter, simply referred to as the program 106) that can be executed by processor 102 and various data associated with the program 106. The program 106 includes a plurality of instructions.

An external sensor 21 is connected to the computer 100. The external sensor 21 includes a recognition sensor that acquires information for recognizing a situation around the vehicle 2, particularly, a situation in front of the vehicle 2. Examples of the recognition sensor include laser imaging detection and ranging (LiDAR) and a millimeter wave radar. The information obtained by the external sensor 21 is transmitted to the computer 100.

An internal sensor 22 is connected to the computer 100. The internal sensor 22 includes a state sensor that acquires information on a motion of vehicle 2. Examples of the state sensor include a wheel speed sensor, an acceleration sensor, an angular velocity sensor, and a turning angle sensor. The acceleration sensor and the angular velocity sensor may be IMUs. The information obtained by the internal sensor 22 is transmitted to computer 100.

In addition, various devices, such as a GPS receiver 23, a navigation system 24, and a data communication device 25, are connected to the computer 100. The GPS receiver 23 acquires position information of the vehicle 2 and provides the acquired position information to the computer 100. The navigation system 24 creates a route plan from a map and provides the created route plan to the computer 100. The data communication device 25 is connected to a server via a communication network, acquires the map information needed for autonomous driving from the map on the server, and provides the acquired map information to the computer 100.

Further, a steering actuator 31, a driving actuator 32, and a braking actuator 33 are connected to the computer 100. These actuators 31, 32, 33 are operated by control signals transmitted from the computer 100. During the autonomous driving of the vehicle 2, these actuators 31, 32, 33 are automatically operated by the computer 100.

The program 106 stored in the memory 104 includes an autonomous driving program for realizing the autonomous driving. The computer 100 functions as an autonomous driving system that autonomously drives the vehicle 2 by the processor 102 executing the autonomous driving program. The autonomous driving system generates a target trajectory based on a traveling plan. The target trajectory is a traveling trajectory that the vehicle 2 should finally take, and is decided in consideration of a collision with an obstacle in front of the vehicle 2 detected by the external sensor. The target trajectory includes a set of target positions of the vehicle 2 on a road on which the vehicle 2 travels and a target speed for each target position. In order to cause the vehicle 2 to follow the target trajectory, the autonomous driving system calculates a deviation (lateral deviation, yaw angle deviation, speed deviation, or the like) between the vehicle 2 and the target trajectory, and operates the actuators 31, 32, 33 to decrease the deviation.

In addition, the program 106 also includes a VLO control program 108 for actuating the VLO control on the vehicle 2.

When the VLO control program 108 is executed by the processor 102, the computer 100 functions as an "offset controller" and the external sensor 21 functions as a "detection device" that detects the approaching vehicle in the adjacent lane. In addition, when the VLO control program 108 is executed by the processor 102, the processor 102 functions as a VLO control gain determination unit 110, a VLO control gain setting unit 120, and a VLO control realizing unit 130.

3. Logic of VLO Control Program

Figure 5:
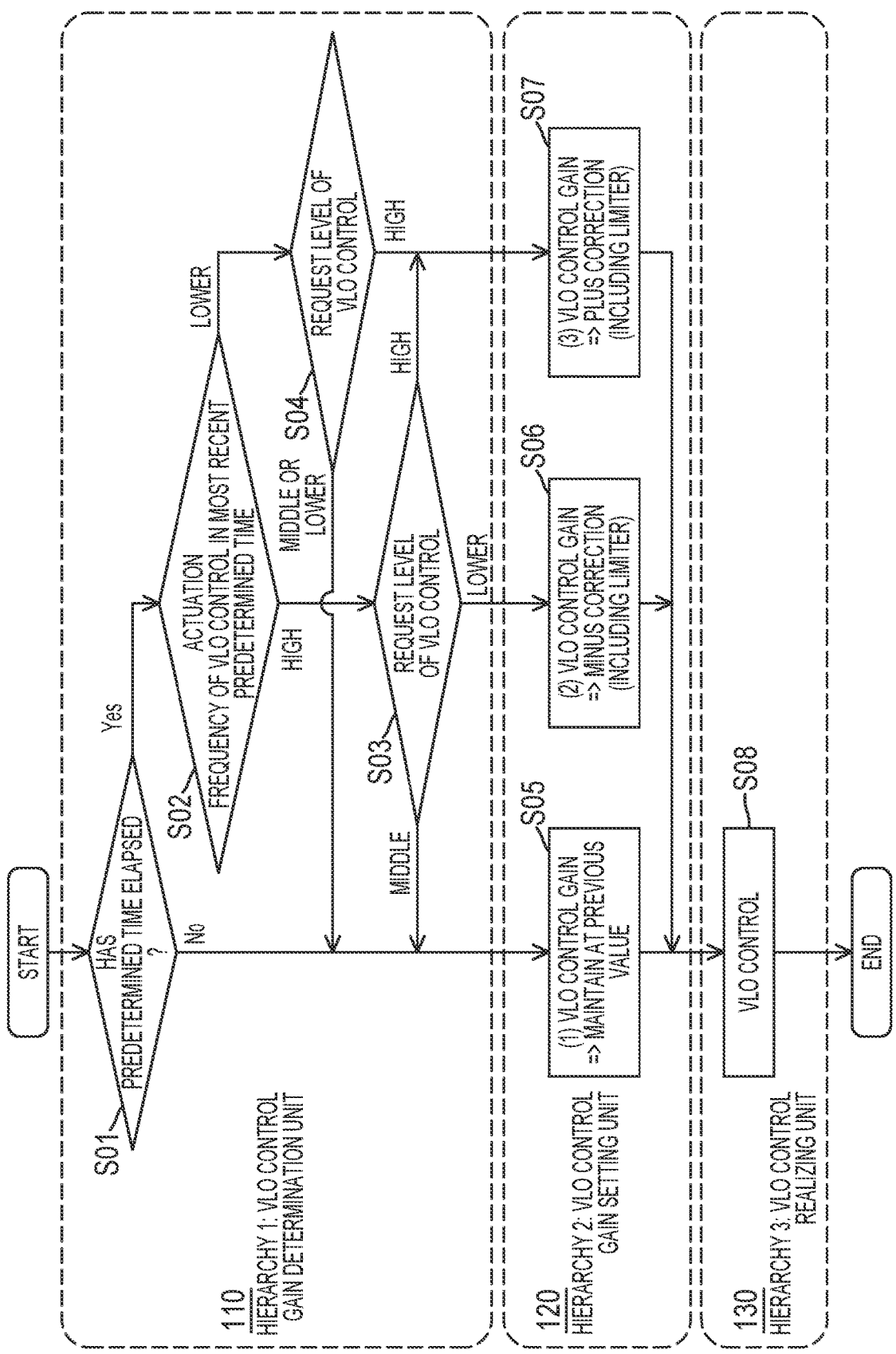
FIG. 5 is a flowchart showing the logic of a VLO control program according to the embodiment of the present disclosure.

FIG. 5 is a flowchart showing the logic of the VLO control program 108. The logic of the VLO control program 108 includes three hierarchies. A hierarchy 1 corresponds to the VLO control gain determination unit 110. A hierarchy 2 corresponds to the VLO control gain setting unit 120. Moreover, a hierarchy 3 corresponds to the VLO control realizing unit 130.

In the hierarchy 1, that is, the VLO control gain determination unit 110, a determination for setting a VLO control gain is made. The determination of the hierarchy 1 includes four determination processes from step S01 to step S04. The VLO control gain is a gain used to calculate the offset amount. The offset amount is increased by increasing the VLO control gain, and decreases the offset amount is decreased by decreasing the VLO control gain.

In the hierarchy 2, that is, in the VLO control gain setting unit 120, the VLO control gain is set based on a determination result in the hierarchy 1. Setting the VLO control gain includes maintaining the VLO control gain at a previous value (step S05), executing minus correction of the VLO control gain (step S06), and executing plus correction of the VLO control gain (step S07). Note that the minus correction includes limiting the VLO control gain at a lower limit. In addition, the plus correction includes limiting the VLO control gain with an upper limit.

In the hierarchy 3, that is, in the VLO control realizing unit 130, the VLO control is executed by using the VLO control gain set in the hierarchy 2 (step S08).

Next, the logic of the VLO control program 108 will be described in detail along the flowchart. First, in step S01, whether or not a predetermined time has elapsed since a previous determination is determined. The predetermined time set in step S01 may be a time defined by the set period shown in FIG. 3, or may be a shorter time. The previous determination by the VLO control gain determination unit 110 is maintained until the predetermined time has elapsed.

In a case where the predetermined time has not elapsed since the previous determination, the process proceeds to step S05 of the hierarchy 2, and the VLO control gain is maintained at the previous value.

When the predetermined time has elapsed, the determination of step S02 is made. In step S02, whether the actuation frequency of the VLO control in the most recent predetermined time is high or low is determined. The predetermined time set in step S02 is the time defined by the set period shown in FIG. 3. Whether the actuation frequency is high or low is determined depending on whether the actuation frequency is equal to or more than or is less than the determination threshold value. An example of the determination threshold value of the actuation frequency is that the VLO control has been actuated 20 times in the most recent past 10 minutes. Note that the number of minutes to set the predetermined time and the number of times to set the actuation frequency are related to whether or not the occupant will get the car sickness, thereby being decided based on ergonomics.

In a case where a determination is made in step S02 that the actuation frequency is high, a determination in step S03 is subsequently made. In step S03, a determination is made as to a request level of the VLO control. The request level is a request for the magnitude of the offset amount. The request levels of the VLO control determined in step S03 are three levels of "high", "middle", and "low".

On the other hand, in a case where a determination is made in step S02 that the actuation frequency is low, a determination in step S04 is subsequently made. Also in step S04, a determination is made as to the request level of the VLO control. The request levels of the VLO control determined in step S04 are two levels of "high" and "middle or lower". The request level of "high" in the determination of step S04 is the same level as the request level of "high" in the determination of step S03. The request level "middle or lower" in the determination in step S04 is the sum of the request levels of "middle" and "low" in the determination in step S03.

The request level of the VLO control is changed in accordance with a degree of danger of a traveling scene of the vehicle 2. For example, in a case where the vehicle 2 travels alongside a large-sized vehicle, such as a truck or a bus, the request level of the VLO control is high. Conversely, in a case where the vehicle in the adjacent lane that travels alongside the vehicle is a small-sized vehicle, particularly, in a case where the vehicle is a smaller-sized vehicle than the vehicle 2, the request level of the VLO control is low. In addition, in a case where the traveling position of the vehicle that travels in the adjacent lane is closer to the own lane side of the vehicle 2, the request level of the VLO control is increased, and in a case where the traveling position of the vehicle that travels in the adjacent lane is closer to the opposite side, the request level of the VLO control is decreased. In addition, the request level of the VLO control is changed in accordance with a vehicle speed, the visibility of the surroundings, the weather, or the like.

In a case where the actuation frequency of the VLO control is high and the request level is low, the process proceeds to step S06 of the hierarchy 2 in accordance with the determination in step S03, and the minus correction of the VLO control gain is executed. The offset amount when the VLO control is actuated is decreased by the minus correction of the VLO control gain. As a result, even in a situation in which the VLO control is frequently actuated, the sense of discomfort of the occupant is reduced by decreasing the lateral acceleration acting on the occupant.

In a case where the actuation frequency of the VLO control is high and the request level is middle, the process proceeds to step S05 of the hierarchy 2 in accordance with the determination in step S03, and the VLO control gain is maintained at the previous value. In this case, by maintaining the offset amount, a balance is achieved between the reduction of the sense of discomfort of the occupant and ensuring the sense of security of the occupant.

In a case where the actuation frequency of the VLO control is high and the request level is high, the process proceeds to step S07 of the hierarchy 2 in accordance with the determination in step S03, and the plus correction of the VLO control gain is executed. In this case, in response to the high request level of the VLO control, a priority is given to ensuring the sense of security and the safety of the occupant over the reduction of the sense of discomfort of the occupant.

In a case where the actuation frequency of the VLO control is low and the request level is middle or lower, the process proceeds to step S05 of the hierarchy 2 in accordance with the determination in step S04, and the VLO control gain is maintained at the previous value. In a case where the actuation frequency of the VLO control is low, the sense of discomfort of the occupant is low, so that there is room for increasing the offset amount. However, in the present embodiment, in a case where the request level of the VLO control is not high, the offset amount is intentionally not increased and is maintained at the previous value.

In a case where the actuation frequency of the VLO control is low and the request level is high, the process proceeds to step S07 of the hierarchy 2 in accordance with the determination in step S04, and the plus correction of the VLO control gain is executed. By increasing the offset amount in response to the high request level of the VLO control, the sense of security and the safety of the occupant can be ensured. In addition, since the actuation frequency of the VLO control is low, even in a case where the offset amount is increased, there is a low risk that the sense of discomfort of the occupant is increased.

In accordance with the determination made in the hierarchy 2, the minus correction of the VLO control gain is executed solely in a case where the actuation frequency of the VLO control in the most recent predetermined time is high and the current request level of the VLO control is low. In step S08 of the hierarchy 3, the VLO control is executed by using the VLO control gain set in step S05, S06, or S07.

By executing the VLO control program 108 including the logic described above by the processor 102, during the actuation of the VLO control, the needed offset amount can be ensured and the occurrence of the lateral acceleration that induces the car sickness of the occupant can be suppressed. That is, both the reduction of the sense of discomfort of the occupant and the sense of security of the occupant can be achieved.

FIG. 6 is a table showing an operation example of the traveling assistance device 10 based on the flowchart shown in FIG. 5. In the operation example, the time during which the previous determination is maintained, that is, the predetermined time set in step S01 is 10 minutes. In addition, the most recent predetermined time for calculating the actuation frequency of the VLO control, that is, the predetermined time set in step S02 is also 10 minutes.

In the operation example, a surrounding situation of the vehicle 2 is changed from an unoccupied state to a relatively congested state, and then is changed to the unoccupied state again. Here, the unoccupied state means a state in which the actuation frequency of the VLO control is less than the determination threshold value, and a determination is made in step S02 that the actuation frequency of the VLO control is low. In a case where a determination is made that the actuation frequency is low, the determination in step S04 is next made in the flowchart. In the operation example, a determination is made that the request level of the VLO control is high in all cases where the actuation frequency of the VLO control is low.

The relatively congested state means a state in which the actuation frequency of the VLO control is equal to or more than the determination threshold value, and a determination is made in step S02 that the actuation frequency of the VLO control is high. In a case where a determination is made that the actuation frequency is high, the determination in step S03 is next made in the flowchart. Note that, in the operation example, a determination is made that the request level of the VLO control is low in all cases where the actuation frequency of the VLO control is high.

In a column of a VLO control gain process in the table, a process described as (2) means that the process of step S06 has been executed as a VLO control gain setting process. A process described as (3) means that the process of step S07 has been executed as the VLO control gain setting process. An upper limit amount of the offset amount is set to 20 cm, and a lower limit amount thereof is set to 0 cm. In addition, an increase/decrease amount of the offset amount is 5 cm per time. Note that the offset amount can be set in a non-step manner by finely setting the VLO control gain or mapping the VLO control gain.

As shown in the operation example, with the traveling assistance device 10 according to the present embodiment, in a case where the actuation frequency of the VLO control is changed, the offset amount is gradually decreased or increased instead of being suddenly switched between the maximum value and the minimum value. By executing such a process of changing the offset amount, a sense of incongruity of the occupant due to the change of the offset amount can be reduced.

What is claimed is:

1. A traveling assistance method comprising:
actuating offset control of offsetting a traveling position of a vehicle to increase a lateral distance from an approaching vehicle in an adjacent lane;
calculating an index value that is decided from an actuation frequency of the offset control and in which a higher weight is given to an actuation frequency of the offset control in a first time period than to an actuation frequency of the offset control in a second time period, the second time period preceding the first time period;
changing an offset amount when the offset control is actuated, in accordance with the index value; and
setting the index value to one in a case where the weight of the offset control that has been actuated in the first time period, and setting the index value to zero in a case where the weight of the offset control that has been actuated in the second time period.

2. The traveling assistance method according to claim 1, wherein changing the offset amount includes decreasing the offset amount in a case where the index value is equal to or more than a predetermined value.

3. The traveling assistance method according to claim 2, wherein changing the offset amount includes increasing, in a case where a request level of the offset control that is currently requested is equal to or more than a predetermined level, the offset amount even in a case where the index value is equal to or more than the predetermined value.

4. The traveling assistance method according to claim 2, wherein changing the offset amount includes maintaining, after the offset amount reaches a lower limit amount, the offset amount at the lower limit amount even in a case where the index value is equal to or more than the predetermined value.

5. The traveling assistance method according to claim 1, wherein changing the offset amount includes increasing the offset amount in a case where the index value is less than a predetermined value.

6. The traveling assistance method according to claim 5, wherein changing the offset amount includes maintaining, in a case where a request level of the offset control that is currently requested is less than a predetermined level, the offset amount at a previous value even in a case where the index value is less than the predetermined value.

7. The traveling assistance method according to claim 5, wherein changing the offset amount includes maintaining, after the offset amount reaches an upper limit amount, the offset amount at the upper limit amount even in a case where the index value is less than the predetermined value.

8. The traveling assistance method according to claim 1, further comprising setting a number of minutes for a predetermined time period and setting a number of times for the actuation frequency, the set number of minutes and the set number of times are related to whether or not an occupant gets car sickness.

9. The traveling assistance method according to claim 1, further comprising setting a control gain for calculating the offset amount includes maintaining the control gain at a first value, executing minus correction of the control gain, and executing plus correction of the control gain.

10. The traveling assistance method according to claim 1, further comprising requesting one of a plurality of request levels of the offset control in response to determining a first actuation frequency, and requesting a second one of a plurality of request levels of the offset control in response to determining a second actuation frequency, the second actuation frequency being lower than the first actuation frequency.

11. The traveling assistance method according to claim 1, further comprising changing a request level of the offset control in accordance with a traveling scene of the vehicle that includes a vehicle type.

12. A traveling assistance device comprising:
- a detection device configured to detect an approaching vehicle in an adjacent lane; and
- an offset controller configured to offset a traveling position of a vehicle to increase a lateral distance from the approaching vehicle in response to detection of the approaching vehicle,
- wherein the offset controller is configured to execute:
  - calculating an index value that is decided from an actuation frequency of offset control and in which a higher weight is given to an actuation frequency of the offset control in a first time period than to an actuation frequency of the offset control in a second time period, the second time period preceding the first time period,
  - changing an offset amount when the offset control is actuated, in accordance with the index value, and
  - setting the index value to one in a case where the weight of the offset control that has been actuated in the first time period, and setting the index value to zero in a case where the weight of the offset control that has been actuated in the second time period.

13. A non-transitory storage medium storing a program causing a computer mounted on a vehicle to execute:
- actuating offset control of offsetting a traveling position of the vehicle to increase a lateral distance from an approaching vehicle in an adjacent lane;
- calculating an index value that is decided from an actuation frequency of the offset control and in which a higher weight is given to an actuation frequency of the offset control a first time period than to an actuation frequency of the offset control in a second time period, the second time period preceding the first time period;
- changing an offset amount when the offset control is actuated, in accordance with the index value; and
- setting the index value to one in a case where the weight of the offset control that has been actuated in the first time period, and setting the index value to zero in a case where the weight of the offset control that has been actuated in the second time period.

* * * * *